(No Model.)

P. A. THRASHER.
DRAFT EQUALIZER.

No. 468,978. Patented Feb. 16, 1892.

WITNESSES:
Raymond F. Barnes
G. M. Copenhaver

INVENTOR
Pline A. Thrasher
BY
Hovey & Howes
ATTORNEYS.

UNITED STATES PATENT OFFICE.

PLINE A. THRASHER, OF PROSSER, NEBRASKA.

DRAFT-EQUALIZER.

SPECIFICATION forming part of Letters Patent No. 468,978, dated February 16, 1892.

Application filed September 4, 1891. Serial No. 404,767. (No model.)

*To all whom it may concern:*

Be it known that I, PLINE A. THRASHER, a citizen of the United States, residing at Prosser, in the county of Adams and State of Nebraska, have invented certain new and useful Improvements in Draft-Equalizers for Self-Binding Harvesters; and I do hereby declare the following to be a full, clear, and exact description of the invention, such as will enable others skilled in the art to which it appertains to make and use the same.

This invention relates, generally, to draft-equalizers, and particularly to four-horse equalizers for self-binding harvesters; and it has for its object to provide a simple inexpensive device of the kind named, by the use of which the binder may be tilted without interfering with the draft, and the machine be turned without undue strain on the collars of the horses, and the draft equally divided between the horses; and it consists in the parts and combinations of parts hereinafter described and claimed.

Figure 1:
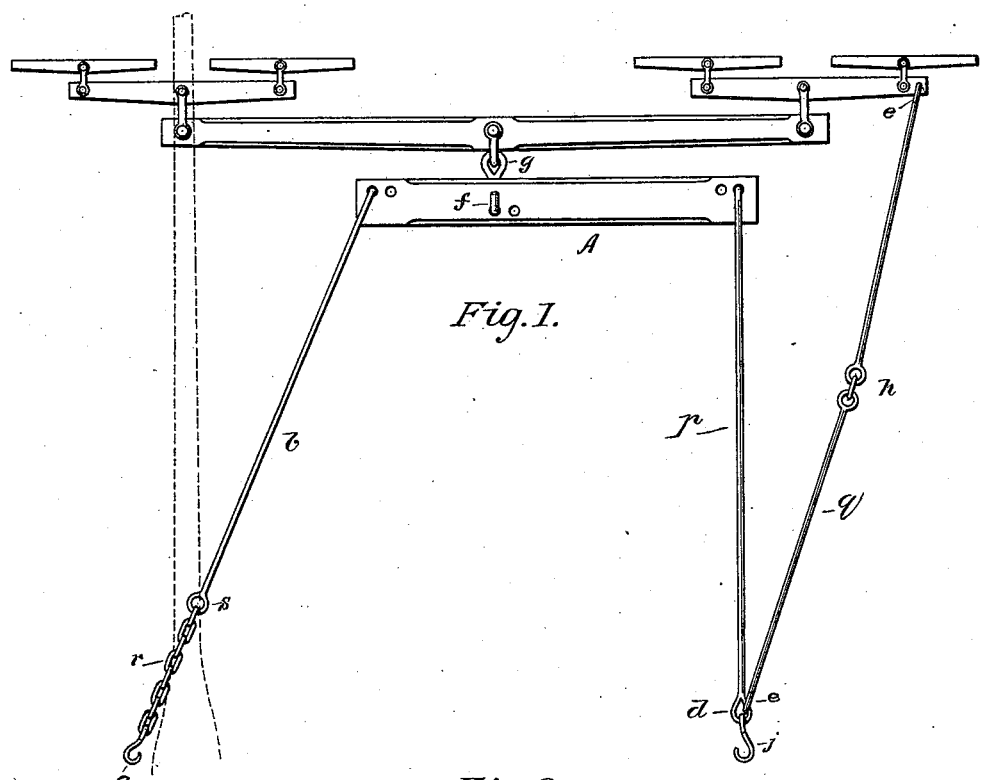
Figure 2:
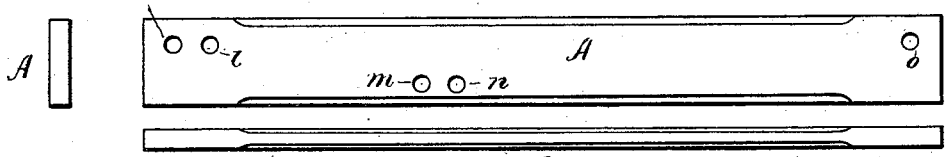
Figure 3:
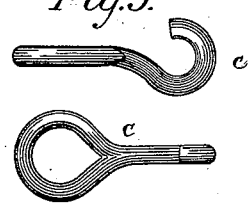
Figure 4:
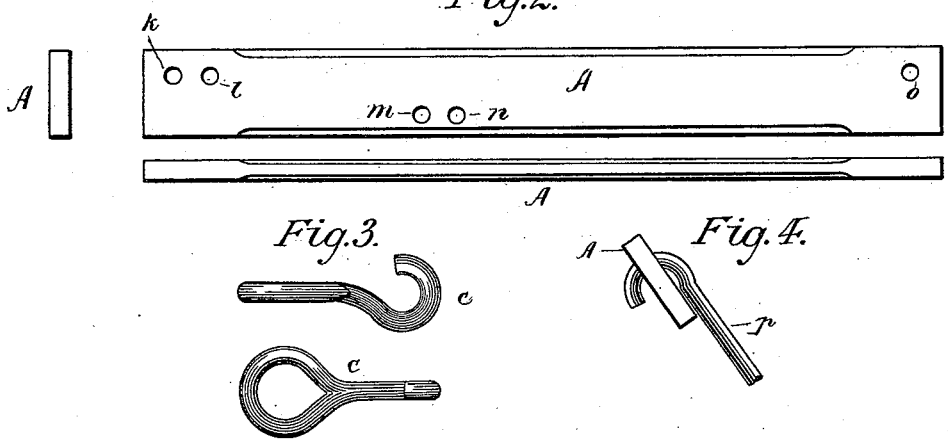

In the accompanying drawings, forming a part of this specification, Figure 1 is a plan view of the device attached to the splinter-bar carrying two doubletrees; Fig. 2, end, plan, and edge views of the evener-bar; Fig. 3, side and plan views of one of the hooks, and Fig. 4 a detail view.

Similar letters refer to similar parts throughout the several views.

A represents the evener-bar, which consists of a flat bar of metal having formed therein near its edge at one end the perforations $k\,l$ and at the opposite end the perforation $o$, while near the opposite edge at about one-third the distance from the end of the bar two perforations $m\,n$ are formed. To the ends of the bar A are connected the rods $b$ and $p$, the former being connected to either one of the perforations $k\,l$ by a hook formed on its end passing through said perforation and the latter rod $p$ being likewise connected at the opposite end of the bar. The rod $b$, as will be noticed, is much shorter than rod $p$, and is provided with a chain $r$, which is connected to an eye $s$, formed on the end of the rod, said chain having its other end provided with a hook $e$. The rod $p$ terminates in an eye $d$, by which a hook $j$ is loosely connected with said rod. A rod $q$, which is preferably formed in two parts loosely linked together, as at $h$, and formed with a hook $e$ at each end, is hooked at one end to the eye $d$, as clearly shown in Fig. 1, and at the other end to a clevis or in the right-hand end of the right-hand doubletree, so that the strain on the collars of the horses in turning the machine will be reduced. A hook $f$, having an eye $g$ at one end, is provided for the purpose of connecting the evener-bar to the splinter-bar. By means of the eye $g$ of hook $f$ the evener-bar is attached to the splinter-bar and the hooks $c$ and $j$ to the frame of the binder or other machine, and said attachment may be varied in order to shift the load, by changing the hooked end of the rod $b$ and the hook $f$ from one perforation to another, as found desirable, while the fact that the hooks $c$ and $j$ are only loosely secured to the rods enables the binder or other machine to be tilted without interference with the draft. The rod $q$ is hooked at one end in eye $d$ and at the other end to the end of the doubletree of the right-hand outside horse, so that in turning the machine the draft or strain is directly on the traces and relieving the inside horse of strain and also taking the strain off the collar of the tongue-horse. C represents the tongue of the machine.

By the use of this simple device, all parts of which are separable one from the other, the entire side draft of the machine is shifted and made perfectly equal when three horses are used on one side of the tongue and one on the other side, and it works perfectly with the splinter-bar attached either above or below to the tongue.

Having thus described my invention, what I claim as new, and desire to secure by Letters Patent, is—

1. In a draft-equalizer for four horses, the combination of the evener-bar, the splinter-bar carrying the doubletrees loosely connected to said evener-bar, and rods connecting the ends of the evener-bar and the vehicle, substantially as described.

2. The combination, in a draft-equalizer for self-binders, of the evener-bar having perforations near each end and also intermediate one end and the center, rods having hooked ends connected to said bar, one of said rods having a chain carrying a hook secured to its end and a hook loosely secured to the end of the other rod, and a rod having hooked ends adapted to engage the end of said last-named rod loosely, substantially as described.

3. The combination, in a draft-equalizer for self-binders, of the evener-bar, the splinter-bar connected to said evener-bar, the doubletrees connected to said splinter-bar, rods loosely connecting said evener-bar and the binder, and a rod connecting one end of one of the doubletrees and binder, substantially as described.

4. The combination, in a four-horse draft-equalizer for self-binders, of an evener-bar, the rods carrying hooks connecting the ends of said evener-bar and the binder, the splinter-bar connected to the evener-bar, the doubletrees attached to the ends of the splinter-bar, and a jointed rod connected at one end to the rear end of one of said hooked rods and at its other end to the outer end of one of said doubletrees, substantially as described.

In testimony whereof I affix my signature in presence of two witnesses.

PLINE A. THRASHER.

Witnesses:
L. J. CAPPS,
J. C. STEVENS.